Inventor
Lawrence J. May
By
Blackmor, Spencer & Hink
Attorneys

April 30, 1940.  L. J. MAY  2,198,782
OIL SEALING DEVICE
Filed March 14, 1938  4 Sheets-Sheet 3

Inventor
Lawrence J. May
By
Blackmore, Spencer & Flint
Attorneys

April 30, 1940. L. J. MAY 2,198,782
OIL SEALING DEVICE
Filed March 14, 1938 4 Sheets-Sheet 4

Inventor
Lawrence J. May
By
Blackmore, Spencer & Flint
Attorneys

Patented Apr. 30, 1940

2,198,782

UNITED STATES PATENT OFFICE 2,198,782

OIL SEALING DEVICE

Lawrence J. May, Indianapolis, Ind., assignor to General Motors Corporation, Detroit, Mich., a corporation of Delaware Application March 14, 1938, Serial No. 195,702

9 Claims. (Cl. 308—36.1)

My invention consists in an oil sealing device for preventing the flow of lubricating oil from a bearing along a rotating shaft which is supported thereby; and in the embodiment thereof hereinafter disclosed the same is designed for use in connection with a shaft which carries the rotating impeller of supercharging mechanism adapted to supply combustible mixture to the cylinders of a multiple cylinder internal combustion engine. In such installations a bearing for the shaft which supports and drives the impeller is inaccessible to a considerable degree, and it is difficult and usually impossible to prevent lubricating oil from escaping therefrom and flowing along the shaft; and lubricating oil is particularly objectionable in a combustible mixture which is supplied to an engine. Gas in the crankcase of the engine, and which is under considerable pressure, has free access to the bearing; while a more or less complete vacuum is maintained within the casing in which the impeller rotates. These two forces act in conjunction with one another and if not counteracted result in an objectionable flow of lubricating oil from the bearing along the shaft and into the impeller casing, thus contaminating the combustible mixture.

The object of my invention is to prevent the flow of lubricating oil from the bearing along the shaft and into the impeller casing. This is accomplished by providing means for returning the greater part of oil escaping from the bearing directly to the crankcase of the engine, and by providing other means for preventing the vacuum in the impeller casing from causing such smaller part of the oil as may not be returned by the first means from being drawn into the impeller casing due to the vacuum therein. All the oil which escapes from the bearing is returned to the crankcase and, while the two means or devices mentioned function to a considerable degree independently of one another, and either may be used without the other, more complete arresting of the flow of oil is secured when they are used in combination with one another and both are so used in the embodiment of my invention hereinafter described.

The drawings accompanying and forming a part of this specification illustrate the preferred form of my improved oil flow preventing device, and the features wherein the same consists are particularly claimed in the concluding claims. My invention, however, is regarded as extending to and including such variations and modifications of the particular embodiment thereof illustrated and described as will be obvious to those skilled in the art to which my invention relates, so long as they come within the scope of the concluding claims wherein the particular features wherein my invention consists are enumerated.

Referring now to the drawings accompanying and forming a part of this application, and wherein the same reference numerals designate like parts in the various views:

Figure 4 is a fragmentary view showing a section upon a longitudinal plane indicated by the line 4—4, Figure 2 and enlarged to approximately the scale of Figure 3.

Figure 5 is a fragmentary view showing oil supplying means for the bearings for the impeller shaft, upon a longitudinal plane indicated by the line 5—5, Figure 2.

Figure 6:
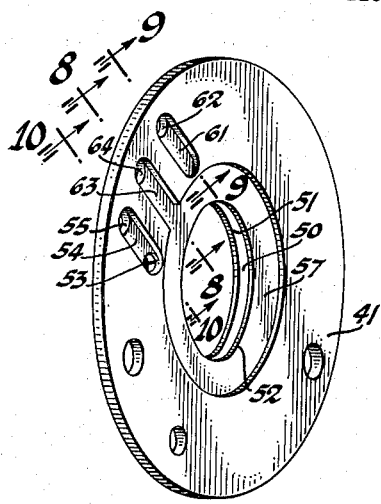
Figure 6 is a perspective view showing the left hand one of two sealing members shown upon a larger scale and in section in Figure 3.
Figure 8:
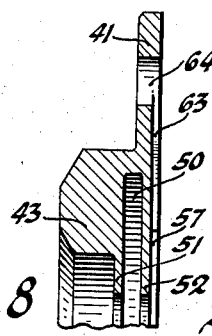
Figure 9:
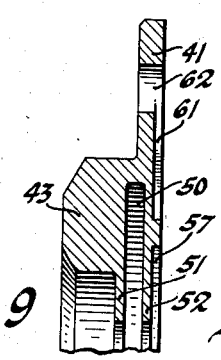
Figure 10:
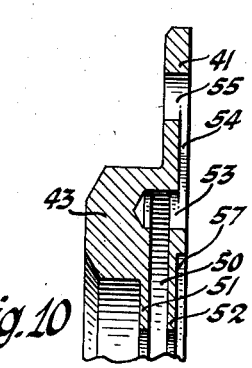

Figures 8, 9 and 10 are views showing sections upon planes indicated by the lines 8—8, 9—9 and 10—10, Figure 6.

Figure 7:
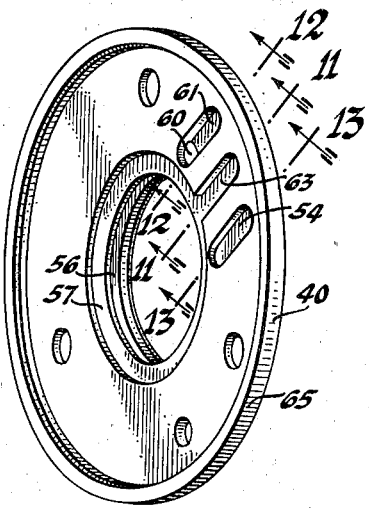
Figure 7 is a similar view showing the right hand one of two sealing members shown in Figure 3.
Figure 11:
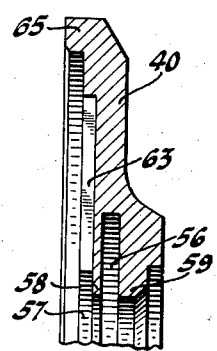
Figure 12:
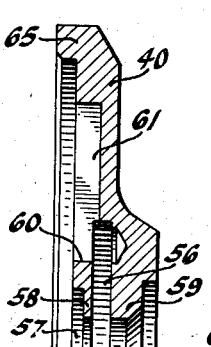
Figure 13:
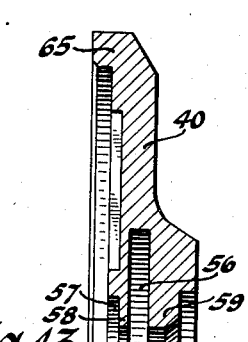

Figures 11, 12 and 13 are views showing sections upon planes indicated by the lines 11—11, 12—12 and 13—13, Figure 7.

Referring now to the drawings, the numeral 14 designates part of the crankcase of a multiple cylinder internal combustion engine, and 15 a hollow accessory housing or casing secured thereto and the interior of which is in communication with the inside of the crankcase so that such pressure as may exist therein, due to leakage past the pistons of the engine, exists also within the accessory housing. This housing carries various accessory devices concerned with the operation of the engine among which is a centrifugal impeller 16 which forces combustible mixture formed by a carburetor 17 into a chamber 18 into which the impeller discharges, and through a suitable manifold leading to the intake valves of the engine as is usual in supercharging devices.

Figure 1:
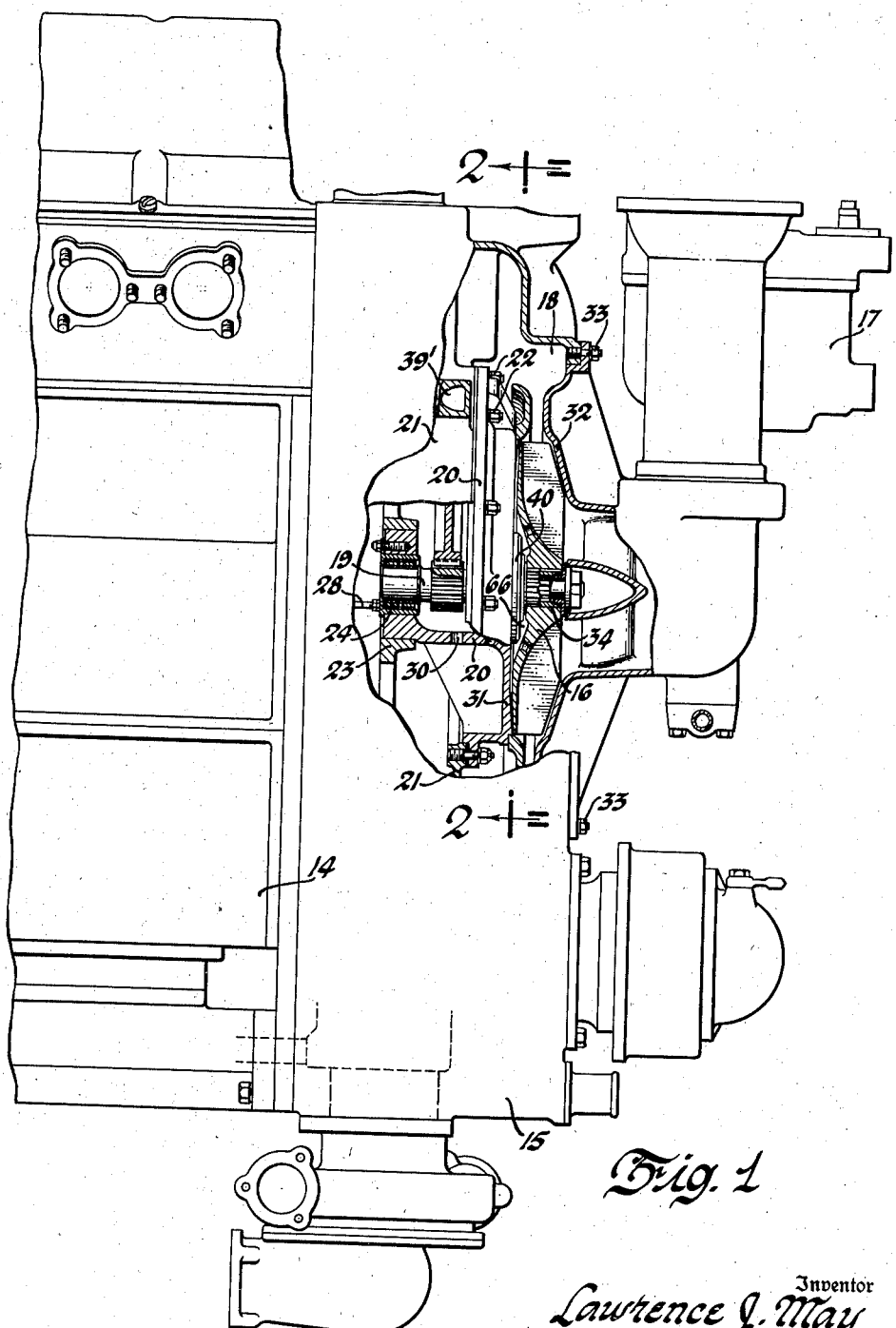
Figure 1 is a view partly in side elevation and partly in section showing my invention used in connection with a centrifugal fan or impeller for supplying combustible mixture to an internal combustion engine.

The supercharger impeller 16 is driven by a shaft 19 which is itself driven from a rotating shaft of the engine through suitable gearing; and this shaft 19 is supported by two bearings which are in turn supported by a bracket 20 arranged within the accessory housing and which member, see Figure 1, is secured to a web 21 within the housing by cap screws 22. The bracket member is shown as extending into an opening in another web 23 to provide additional support therefor.

Figure 3:
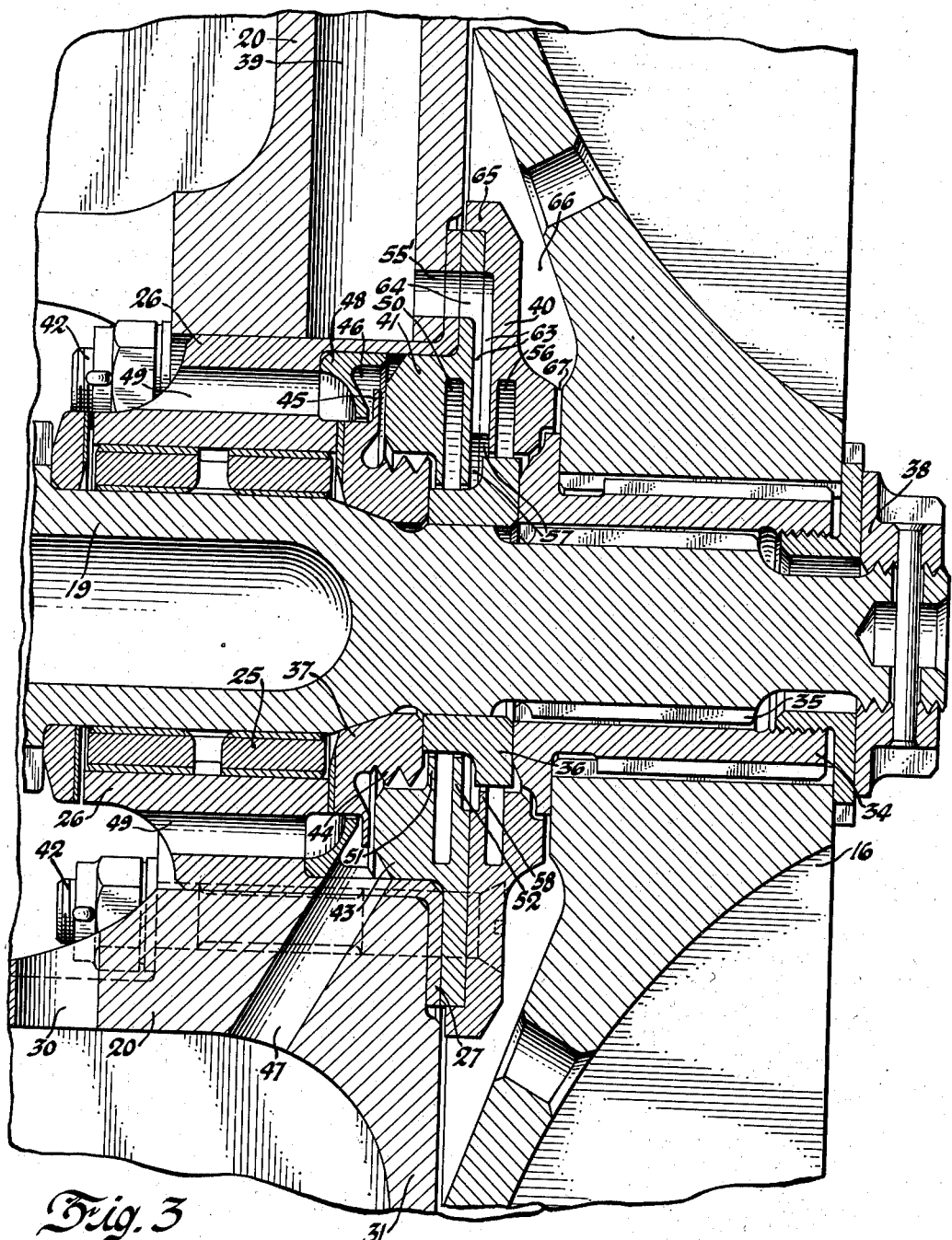
Figure 3 is a sectional view upon a still larger scale, the section being taken upon planes extending longitudinally of the impeller shaft as indicated by the line 3—3, Figure 2.

The bearing 24 at the left hand end of the shaft 19 is housed within a circular opening at the end of the bracket 20; while the bearing 25 at the right hand end of said shaft, see Figure 3, is carried by an annular sleeve 26 having a flange 27, and which sleeve fits within a cylindrical opening provided in the bracket member 20. These bearings are shown as plain floating bearings comprising a tubular bushing having inner and outer facings of bearing metal, but bearings of any suitable kind may be used.

Lubricating oil under pressure is supplied to the bearings 24, 25 through a pipe 28 which communicates with a passaage 29 in the bracket 20 as shown in Figure 5, and such oil as leaks from the bearing 24 flows into the interior of the accessory housing through a hole 30 and back into the crankcase as will be understood, see Figure 1.

The purpose of my invention is to prevent lubricating oil which escapes from the bearing 25 from entering the impeller casing (which is provided by a wall 31, see Figure 1, of the bracket 20 and a cover plate 32 which is secured to the accessory housing by bolts 33) and mixing with the combustible mixture supplied to the engine through the chamber 18 and the manifold system of the engine. There is ordinarily and as explained a slight pressure of around 2 to 5 inches of water inside the crankcase, and the pressure (vacuum) within the impeller casing falls as the carburetor throttle is closed and approaches a vacuum when the throttle is closed to its maximum extent; and these two forces augment one another and tend to cause oil to flow from the bearing 25 and into the mixture supplied to the engine by the supercharging impeller, which flow of oil it is the object of my invention to obviate.

The impeller is carried by an annular sleeve 34 and is driven therefrom through a spline driving connection, and the sleeve is itself driven from the shaft 19 through cooperating splines as shown at 35, Figure 3. The left hand end of the sleeve 34 abuts against a spacing collar 36 which rotates with and is in effect a part of the shaft 19, and this collar abuts against a thrust bearing 37 which also rotates with said shaft and moves in contact with an annular zone upon the annular sleeve 26 as shown. The sleeve 34, the collar 36 and the thrust bearing 37 are held in place upon the right hand end of the shaft 19 by a nut 38 and all three rotate with the shaft as will be understood.

Figure 2:
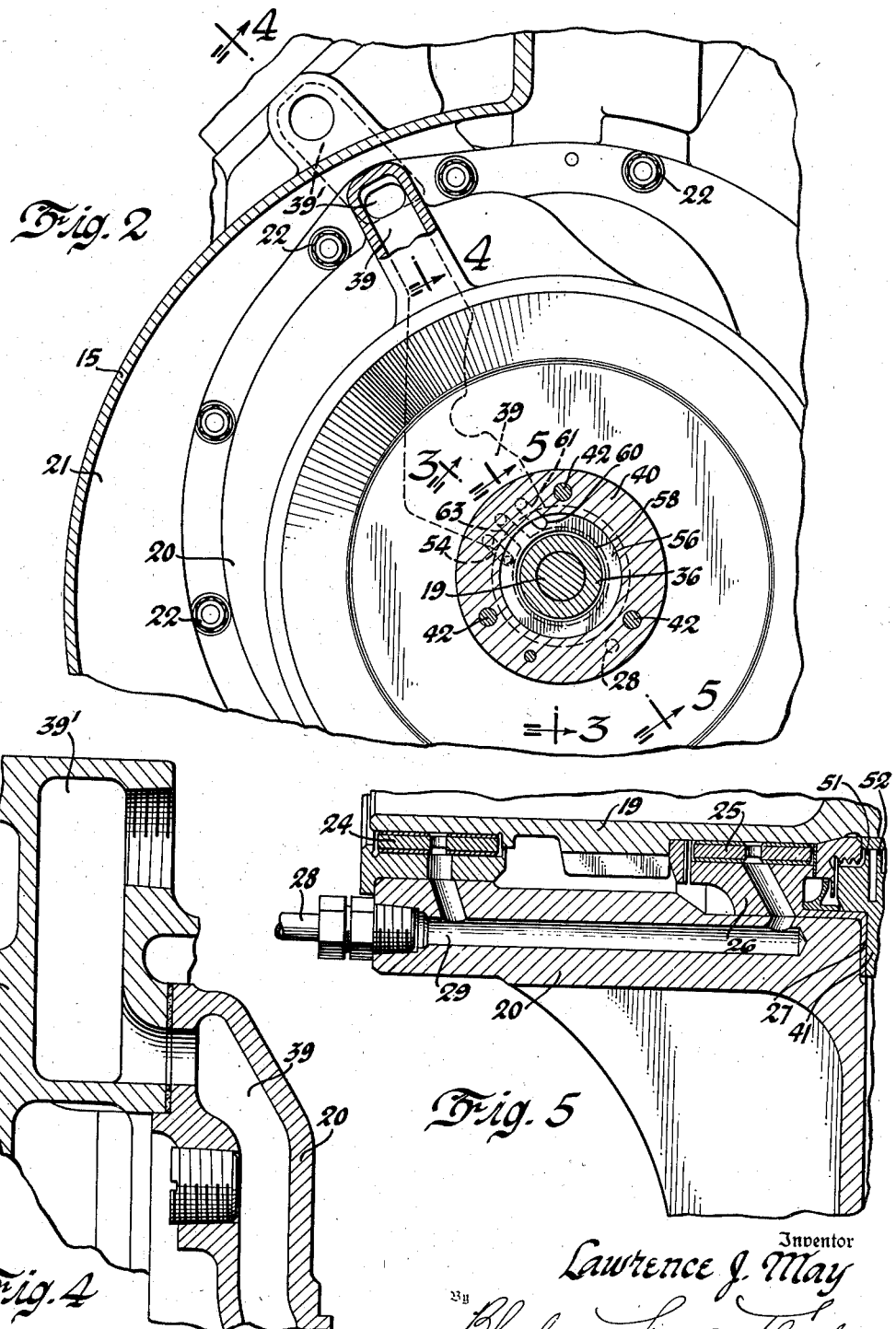
Figure 2 is a fragmentary view showing a section upon a larger scale and upon a vertical transverse plane indicated by the line 2—2, Figure 1.

The bracket member 20 is provided with a cylindrical seat for the sleeve 26 as hereinbefore noted; and there is a cored passage 39 in said bracket member the upper end of which, see Figures 2 and 3, registers with a similarly formed passage 39' in the web 21 and the accessory housing casing, see Figures 1 and 4, and which last named passage communicates with the atmosphere.

Surrounding the spacing collar 36 as best shown in Figure 3 are two disc-shaped sealing members 40, 41 which are secured to the bracket 20 by bolts 42, which bolts extend through the flange 27 and serve also to hold the sleeve 26 assembled with the bracket; and the disc 41 has an annular boss 43 which fits within a recess in the sleeve 26 and closely about a thread 44 upon the thrust bearing 37, the pitch of which thread is such that any oil which may tend to flow toward the right will be forced backward and through a narrow passage between the flange 45 upon the thrust bearing member and the end of the boss 43, and into a chamber 46 from which it will return to the interior of the accessory housing and to the crankcase through a passage 47 in the bracket 20.

The greater part, however, of such oil as may escape from the bearing 25 will not enter the chamber 46 but, on the contrary will be intercepted by a stationary annular baffle member 48 housed within the recess in the sleeve 26 into which the boss 43 extends, and the periphery of which baffle lies as close as practicable (so that there will be a minimum of clearance between the two) to the rotating thrust bearing member 37. This larger part of oil leaking from the bearing 25 will therefore return directly to the accessory housing and crankcase through passages 49 in the sleeve 26.

The sealing members 40, 41 are shown in Figure 3 as assembled with other parts to provide means for preventing oil from the bearing 25 from flowing to the right and entering the impeller chamber, and these members are shown separately in Figures 6 to 13.

Referring now to Figures 6, and 8 to 10, the member 41 has an internal annular chamber 50, the inner peripheries of the side walls 51, 52 of which surround but do not contact with the collar 36, there being as little clearance as practicable between the peripheries of these members. This chamber 50 is placed in communication with the atmosphere by a hole 53, a slot 54 partially in the member 41 and partially in the member 40, and a hole 55 which communicates with the passage 39 which leads to the atmosphere; the opening 55' at the lower end of this passage, see Figure 3, being in communication with the hole 55 as well also as with similar holes which place two other chambers 56, 57 similar to the chamber 50 in communication with the atmosphere, all through the single opening 55' and passage 39; the chamber 57 being formed partly in one and partly in the other of the members 40, 41.

The member 40 has an internal chamber 56 the side walls 58, 59 of which likewise terminate as close as practicable to the periphery of the collar 36, so as to leave a minimum of clearance between their peripheries; and this chamber 56 is placed in communication with the atmosphere by a hole 60, a slot 61 partially in the member 40 and partially in the member 41, and a hole 62 in the member 41 which registers with the opening 55' at the lower end of the passage 39.

The third chamber 57 is formed partly in the member 40 and partly in the member 41, and the side walls 58 and 52 thereof terminate inwardly close to the collar 36, so as to leave as little clearance as possible between the peripheries of said parts. This central chamber is likewise placed in communication with the atmosphere through a slot 63 formed partly in the member 41 and partly in the member 40, and a hole 64 in the member 41 which communicates with the passage 39 through the opening 55' at the lower end thereof.

In the embodiment of my invention illustrated the sealing member 40 has a peripheral flange 65 which encloses the periphery of the member 41 to thereby hold the parts more securely in concentric relation with one another and, while three chambers 50, 56 and 57 are illustrated, all of which are in communication with the atmosphere as hereinbefore explained, the particular number of such chambers may be varied as my invention is not limited to the use of any particular number of such chambers.

As hereinbefore explained the inwardly extending flanges or walls 51, 52, 58 and 59 of the sealing members 41, 40 terminate close to but do not contact with the spacing collar 36, which is in effect a part of the shaft 19, so that slight clearances exist between the inner extremities of said walls and the periphery of said collar. A similar slight clearance is present between the periphery of the baffle 48 and the thrust bearing 37 which likewise is in effect a part of the shaft; and the radial flange 45 rotates close to the radial wall of the boss 43 of the member 41 so that there is but slight clearance between these two elements.

It follows that most of the oil escaping from the bearing returns to the crankcase through the passages 49, and such as may pass the baffle 48 returns through the passage 47; the pressures in these two passages being crankcase pressure and, being balanced, oil returns freely through both said passages. At the same time such oil (if any) as may tend to flow into the annular chamber 46 and toward the impeller casing space 66 wherein there is a high vacuum will be forced backward (toward the left) by the thread 44; the result being that in practice there will be a minimum of oil which will tend to flow past the inner ends of the chambers 50, 57 and 56 and into the impeller casing.

The purpose of the sealing members 40, 41 is to prevent any lubricating oil which may nevertheless pass the thread 44 from being drawn into the space 66 inside the impeller casing, wherein a more or less perfect vacuum exists especially when the carburetor throttle valve is closed, or nearly closed. Such reduction of pressure as may be present within the casing acts through a narrow and preferably tortuous passage 67 to reduce the pressure within the chamber 56; but air to compensate for such reduction enters said chamber 56 through the passage 39 and hole 55', and through the hole 62, slot 61 and hole 60, thus breaking the vacuum in said chamber 56. Inasmuch, however, as the pressure inside the chamber 56 may not fall to atmospheric pressure there may be a reduction of pressure in the chamber 57, which will be equalized by air flowing through the passage 39 and hole 55', and through hole 64 and slot 63, thus breaking the lesser vacuum within said chamber 57; and the still lesser vacuum which may be established in the chamber 50 will be neutralized by air flowing through the passage 39 and hole 55', and through the hole 55, slot 54, hole 53 and into said chamber 50.

It therefore follows that if, as because of an insufficiently free flow of air into the chamber 56, the vacuum in said chamber is not neutralized or not satisfied quickly enough, the lesser vacuum in the chamber 57, and the still lesser vacuum in the chamber 50 will be relieved by flows of air into them; the result being that the vacuum inside the impeller chamber will be ineffective to cause a flow of oil from the bearing 25 and thereinto. As a matter of course such air as flows into the chambers 56, 57 and 50 will flow along the shaft 5 and into the impeller chamber and mix with the combustible mixture flowing to the engine, but the amount thereof will be relatively small and, being free from oil, will be unobjectionable. As hereinbefore stated a greater or lesser number of chambers than three may be used, but I have found three to be a suitable number to use.

Having thus described my invention and explained the operation thereof I claim and desire to secure by Letters Patent:

1. In an oil flow preventing device of the class described and in combination with a rotating shaft, a bearing therefor, and an impeller casing wherein the pressure is less than atmospheric pressure; means comprising a series of vacuum relieving chambers surrounding said shaft and communicating with one another, and one of which is in communication with said impeller casing, for preventing oil escaping from said bearing from entering said casing; and means for providing separate permanently open passages leading from the external atmosphere, one into each of said vacuum relieving chambers, and through which air may flow into said chambers.

2. In an oil flow preventing device of the class described and in combination with a rotating shaft, a bearing therefor, and an impeller casing wherein the pressure is less than atmospheric pressure; means comprising a series of vacuum relieving chambers surrounding said shaft and communicating with one another, and one of which is in communication with said impeller casing, for preventing oil escaping from said bearing from entering said casing; means for providing separate permanently open passages leading from the external atmosphere, one into each of said vacuum relieving chambers, and through which air may flow into said chambers; and means arranged between said bearing and said vacuum relieving chambers for preventing oil escaping from said bearing from reaching said chambers.

3. In an oil flow preventing device of the class described and in combination with a rotating shaft, a bearing therefor, a crankcase, and an impeller casing wherein the pressure is less than atmospheric pressure; means comprising a series of vacuum relieving chambers surrounding said shaft and communicating with one another, and one of which is in communication with said impeller casing, for preventing oil escaping from said bearing from entering said casing; means for providing separate permanently open passages leading from the external atmosphere, one into each of said vacuum relieving chambers, and through which air may flow into said chambers; and means arranged between said bearing and said vacuum relieving chambers for returning oil escaping from said bearing to said crankcase.

4. In an oil flow preventing device of the class described and in combination with a rotating shaft, a bearing therefor, a crankcase, and an impeller casing wherein the pressure is less than atmospheric pressure; a stationary baffle arranged adjacent said bearing for intercepting the flow of oil therefrom toward said impeller casing; means for providing passages leading one from one and another from the other side of said baffle to said crankcase; a screw rotating with said shaft and so formed as to return oil which may pass said baffle toward said crankcase; and means arranged between said screw and said impeller casing for preventing oil which may pass said screw from entering said casing.

5. In an oil flow preventing device of the class described and in combination with a rotating shaft, a bearing therefor, a crankcase, and an impeller casing wherein the pressure is less than atmospheric pressure; a stationary baffle arranged adjacent said bearing for intercepting the flow of oil therefrom toward said impeller casing; means for providing passages leading one from one and another from the other side of said baffle to said crankcase; means comprising a vacuum relieving chamber surrounding said shaft and arranged between said baffle and said impeller casing, and which chamber is in communication with said impeller casing, for preventing oil which may pass said baffle from entering said casing; and means for providing a permanently open passage leading from the external atmosphere into said vacuum chamber, and through which passage air may flow thereinto.

6. In an oil flow preventing device of the class described and in combination with a rotating shaft, a bearing therefor, a crankcase, and an impeller casing wherein the pressure is less than atmospheric pressure; a stationary baffle arranged adjacent said bearing for intercepting the flow of oil therefrom toward said impeller casing; means for providing passages leading one from one and another from the other side of said baffle to said crankcase; a stationary sealing device arranged between said baffle and said impeller casing, and having an internal vacuum relieving chamber which is in communication with said impeller casing, for preventing oil which may pass said baffle from entering said casing; said sealing device having a permanently open passage leading from the external atmosphere therethrough and into said vacuum relieving chamber, and through which passage air may flow thereinto.

7. In an oil flow preventing device of the class described and in combination with a rotating shaft, a bearing therefor, a crankcase, and an impeller casing wherein the pressure is less than atmospheric pressure; a stationary baffle arranged adjacent said bearing for intercepting the flow of oil therefrom toward said impeller casing; means for providing passages leading one from one and another from the other side of said baffle to said crankcase; a stationary sealing device surrounding said shaft and arranged between said baffle and said impeller casing, and having a series of internal vacuum relieving chambers communicating with one another, and one of which is in communication with said impeller casing, for preventing oil which may pass said baffle from entering said casing; said sealing device having a plurality of permanently open passages leading one into each of said vacuum relieving chambers, and through which passages air from the external atmosphere may flow into said chambers.

8. In an oil flow preventing device of the class described and in combination with a rotating shaft, a bearing therefor, a crankcase, and an impeller casing wherein the pressure is less than atmospheric pressure; a stationary baffle arranged adjacent said bearing for intercepting the flow of oil therefrom toward said impeller casing; means for providing passages leading one from one and another from the other side of said baffle to said crankcase; two sealing members secured together and surrounding said shaft and arranged between said baffle and said impeller casing, and which members have three internal vacuum relieving chambers communicating with one another through clearance spaces between them and said shaft, and one of which chambers is in communication with said impeller casing, for preventing oil which may pass said baffle from entering said casing; said sealing members having three permanently open passages leading one into each of said vacuum relieving chambers and through which air from the external atmosphere may flow into said chambers.

9. In an oil flow preventing device of the class described and in combination with a rotating shaft, a bearing therefor, and an impeller casing wherein the pressure is less than atmospheric pressure; two sealing members secured together and surrounding said shaft and arranged between said bearing and said impeller casing, and which members have three internal vacuum relieving chambers communicating with one another through clearance spaces between them and said shaft, and one of which chambers is in communication with said impeller casing, for preventing oil escaping from said bearing from entering said impeller casing; said sealing members having three permanently open passages leading one into each of said vacuum relieving chambers and through which air from the external atmosphere may flow into said chambers.

LAWRENCE J. MAY.